United States Patent
Schaible et al.

(10) Patent No.: US 10,326,260 B2
(45) Date of Patent: Jun. 18, 2019

(54) TEMPORARY CABLE BEND LIMITING DEVICE FOR USE IN CABLE INSTALLATION

(71) Applicant: COMMSCOPE TECHNOLOGIES LLC, Hickory, NC (US)

(72) Inventors: Gregory J. Schaible, Lakeville, MN (US); Patrick Nault, Carver, MN (US); Thomas G. LeBlanc, Westminster, MA (US)

(73) Assignee: CommScope Technologies LLC, Hickory, NC (US)

(*) Notice: Subject to any disclaimer, the term of this patent is extended or adjusted under 35 U.S.C. 154(b) by 528 days.

(21) Appl. No.: 14/995,780

(22) Filed: Jan. 14, 2016

(65) Prior Publication Data

US 2016/0218494 A1    Jul. 28, 2016

Related U.S. Application Data (60) Provisional application No. 62/103,839, filed on Jan. 15, 2015.

(51) Int. Cl.
| | |
|---|---|
| *H02G 1/06* | (2006.01) |
| *H02G 3/30* | (2006.01) |
| *G02B 6/46* | (2006.01) |
| *H02G 3/00* | (2006.01) |

(52) U.S. Cl.
CPC .............. *H02G 1/06* (2013.01); *G02B 6/46* (2013.01); *H02G 3/305* (2013.01); *H02G 3/00* (2013.01); *H02G 3/266* (2013.01)

(58) Field of Classification Search
CPC .. H02G 1/06; H02G 3/00; H02G 3/24; H02G 3/26; H02G 3/266; H02G 3/30; H02G 3/305; H02G 3/32; H02G 3/36; G02B 6/4463; G02B 6/4466; G02B 6/46; G02B 6/48; Y10T 29/4987; Y10T 29/49872
USPC .................................................. 29/450, 451
See application file for complete search history.

(56) References Cited

U.S. PATENT DOCUMENTS

| | | | |
|---|---|---|---|
| 4,911,525 | A | 3/1990 | Hicks et al. |
| D402,265 | S | 12/1998 | Viklund et al. |
| 5,929,380 | A | 7/1999 | Carlson et al. |
| 6,013,875 | A | 1/2000 | Fridenberg et al. |
| 6,546,179 | B2 | 4/2003 | Petri |
| 6,580,029 | B1 | 6/2003 | Bing |

(Continued)

FOREIGN PATENT DOCUMENTS

| | | |
|---|---|---|
| DE | 19945747 A1 | 4/2001 |
| EP | 1349249 A1 | 10/2003 |

(Continued)

OTHER PUBLICATIONS

OFS Fitel, LLC, EZ-Bend Invisilight Optical Solution, 2013, pp. 2, printed in USA. OFS, Marketing Communications, fap-263-0413.

*Primary Examiner* — Peter Dungba Vo
*Assistant Examiner* — Joshua D Anderson
(74) *Attorney, Agent, or Firm* — Merchant & Gould P.C.

(57) ABSTRACT

A cable guide device operates as a cable bend limiting device that is removed once a cable is routed. The device includes a body portion and a guide surface. The body portion is configured to hold the device at a work area. The guide surface provides a surface along which the cable is routed. The guide surface may have a radius of curvature not less than the minimum bend radius of the cable.

10 Claims, 7 Drawing Sheets

(56) References Cited

U.S. PATENT DOCUMENTS

| | | | |
|---|---|---|---|
| 6,903,274 B2 | 6/2005 | Aoki et al. | |
| 6,980,726 B2 | 12/2005 | Daoud et al. | |
| 8,360,127 B2 | 1/2013 | Thompson et al. | |
| 2012/0294580 A1* | 11/2012 | Burek | G02B 6/4457 385/135 |
| 2013/0020015 A1* | 1/2013 | Dickinson | B65H 49/205 156/166 |
| 2013/0294734 A1 | 11/2013 | Takeuchi et al. | |
| 2014/0150971 A1 | 6/2014 | Mann | |
| 2015/0129126 A1* | 5/2015 | Saito | G02B 6/3612 156/307.7 |

FOREIGN PATENT DOCUMENTS

| | | |
|---|---|---|
| JP | 02223326 A | 9/1990 |
| WO | 2005033758 A1 | 4/2005 |

\* cited by examiner

TEMPORARY CABLE BEND LIMITING DEVICE FOR USE IN CABLE INSTALLATION

CROSS REFERENCE TO RELATED APPLICATIONS

This application claims the benefit of provisional application Ser. No. 62/103,839, filed Jan. 15, 2015, which is incorporated herein by reference in its entirety.

BACKGROUND

Optical fiber cables require additional protection against external sources of stress, such as bending, pressure, and strain. The fragile nature of the cables easily causes damage to the cables and/or degradation of the signal transmitted via the cables. For example, an optical fiber cable should not be bent at a radius larger than its minimum bend radius along its path. Otherwise, the cable is subject to breakage or fracture, and a portion of transmitted light pulses leaks out, thereby attenuating the transmitted light pulses and degrading signal quality. Further, such excessive bending can cause functional failure of the cable by changing internal optical properties at the bend. Specifically, light traveling through the cable loses proper internal reflection as it reaches the excessive bend. Thus, when installing a cable, particularly at sharp corners or edges, it is important to route the cable so that bends in the cable are of a sufficient radius to avoid possible light leakage.

SUMMARY

The present disclosure relates generally to a cable guide device. In one possible configuration and by non-limiting example, the cable guide device operates as a temporary cable bend limiting device that is removed once a cable is routed.

One aspect is a device for guiding a cable at a radius larger than a minimum bend radius of the cable. The device includes a body portion and a guide surface. The body portion is configured to engage a holding medium (e.g., an installer's finger, a tool, an extension, etc.) that is configured to hold the device at a work area. The guide surface is connected to the body portion and provides a surface along which the cable is routed. The guide surface may have a radius of curvature not less than the minimum bend radius of the cable. The guide surface may be arranged at the work area by the holding medium such that the cable is routed around the guide surface at the work area. The device is configured to be removed after the cable is routed at the work area.

The cable can be attached to the working area with an adhesive. The body portion has a forward end and a rearward end and may include an engaging hole. The guide surface is connected to the body portion at the forward end. The engaging hole can be open at the rearward end and configured to receive the holding medium.

The holding medium may be an installer's finger that is to be inserted into the engaging hole of the body portion. The guide surface may be configured as a truncated cone shape.

The device may include a support portion configured to be abutted to the work area when the guide surface is arranged at the work area.

The device may include a corner engaging portion configured to engage a corner work area. The corner engaging portion may be configured as a cutout portion that is formed by partially cut out the guide surface.

Another aspect is a method of guiding a cable at a radius larger than a minimum bend radius of the cable. The method may include: engaging a holding medium with a cable guide device; holding the device at a work area; routing the cable around the device; fixing the cable to the work area; and removing the device from the work area. The step of fixing the cable to the work area may include attaching the cable to the work area with an adhesive. The step of holding the device at the work area may include engaging the device at a corner work area.

DETAILED DESCRIPTION

Various examples will be described in detail with reference to the drawings, wherein like reference numerals represent like parts and assemblies throughout the several views. Reference to various examples does not limit the scope of the disclosure and the aspects upon which the examples are based. Additionally, any examples set forth in this specification are not intended to be limiting and merely set forth some of the many possible ways in which the various aspects of the present disclosure may be put into practice.

Figure 1:
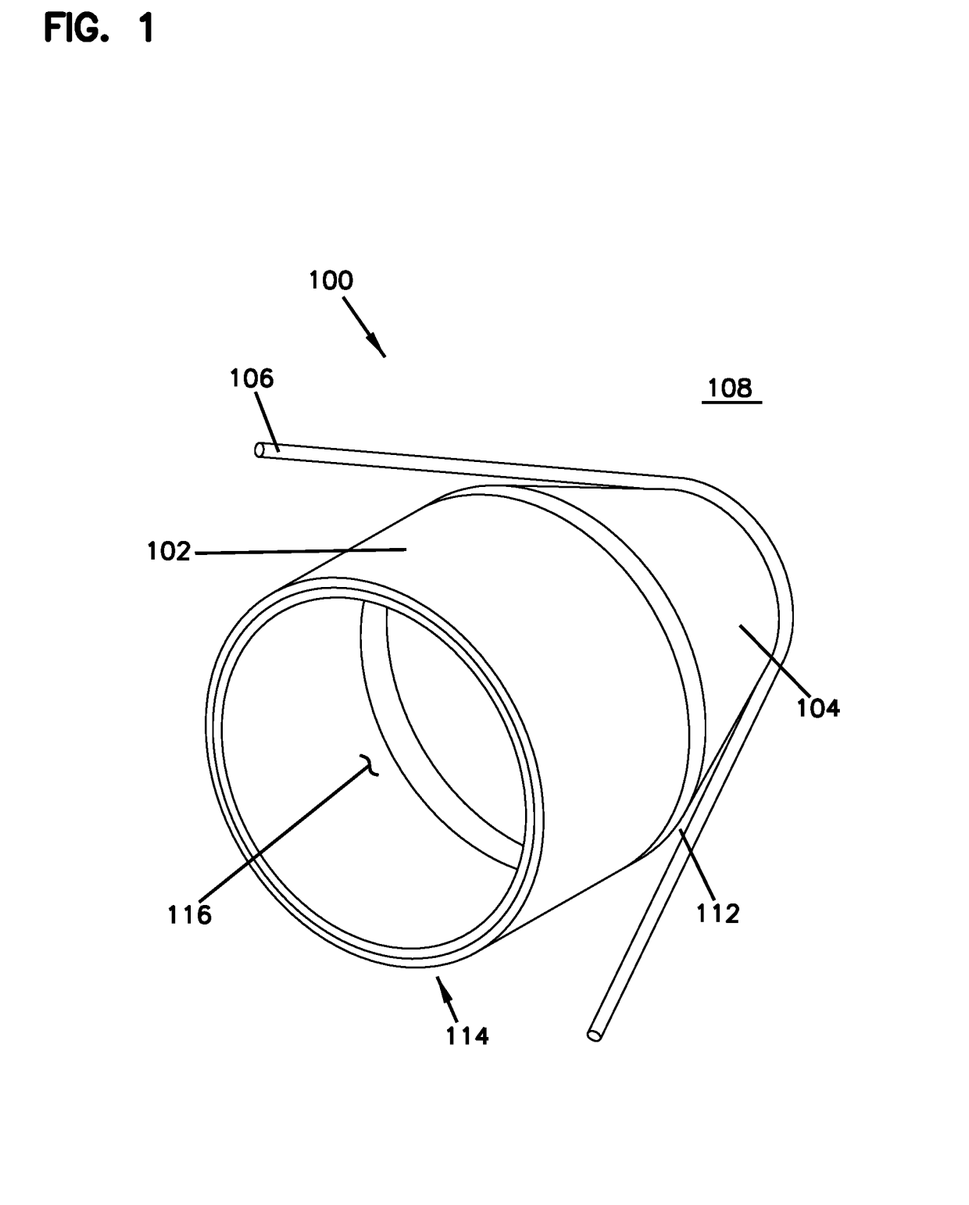
FIG. 1 is a rear perspective view of a cable guide device according to one example of the present disclosure.

FIG. 1 is a rear perspective view of a cable guide device 100 according to one example of the present disclosure. In some examples, the cable guide device 100 includes a body portion 102 and a guide surface 104.

Figure 3:
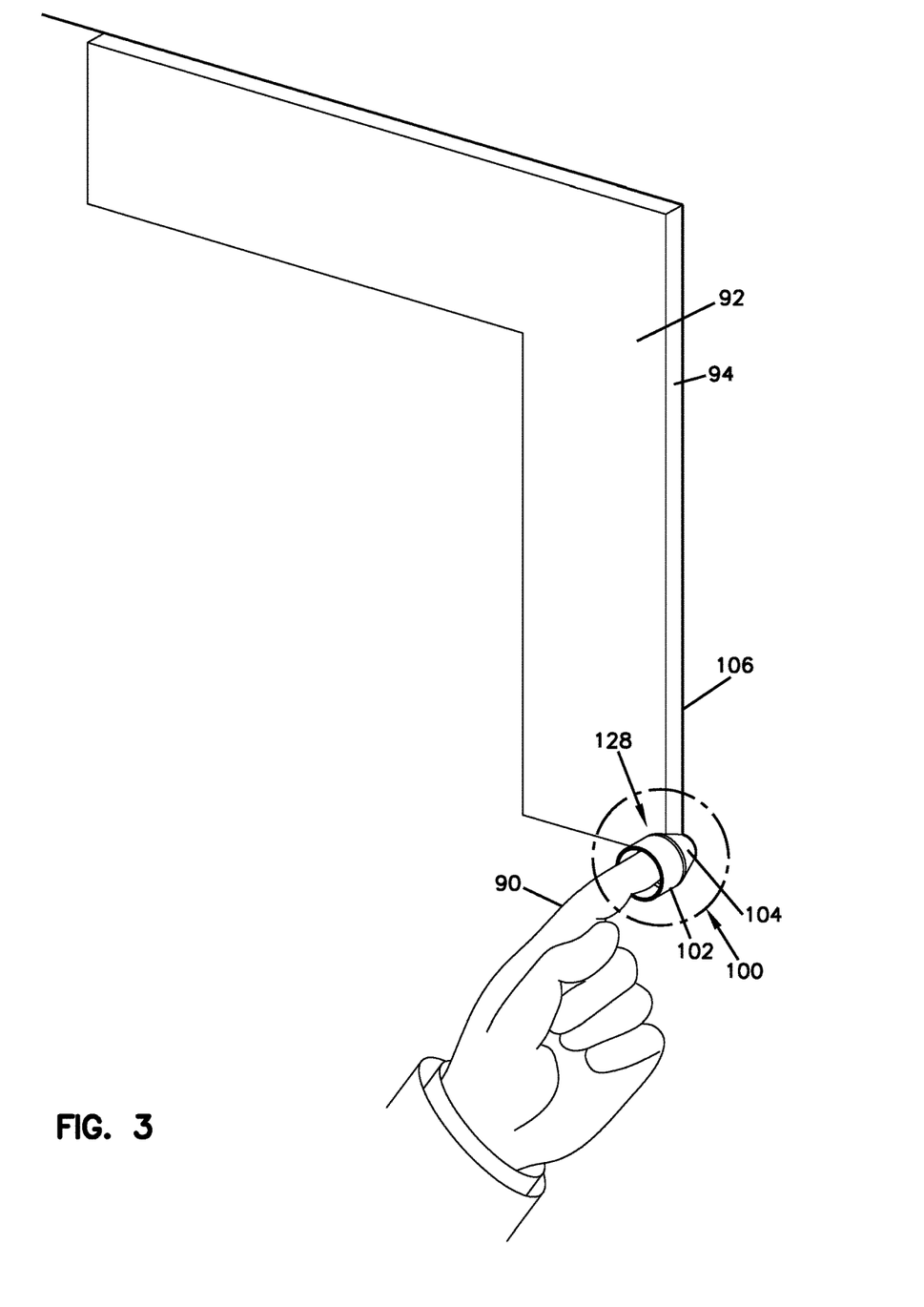
FIG. 3 illustrates the device engaged at a corner work area.
Figure 4:
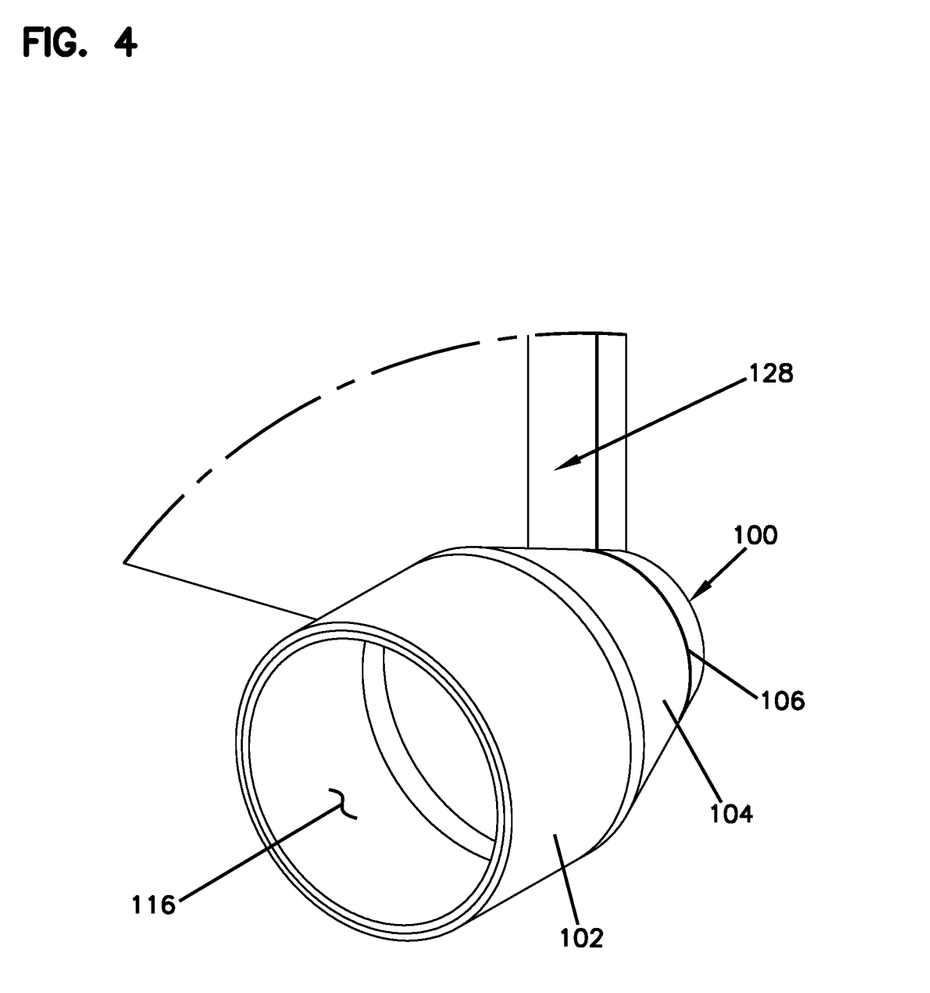
FIG. 4 is an exploded view of the device of FIG. 3.

In general, the cable guide device 100 is configured to be used to route an optical fiber cable 106 along the cable guide device 100 at a work area 108 and prevent the cable 106 from being bent less than the minimum bend radius of the cable 106. Although the cable 106 is described primarily as an optical fiber cable, the principles of the present disclosure are also applicable to any type of cables. The cable 106 is routed at the work area 108 and can be fixed to the work area 108 along a predetermined path. In some examples, the cable 106 is attached to the work area 108 with an adhesive. In other examples, the cable 106 is fixed to the work area 108 with cable clips or any other fasteners. In some examples, the work area 108 is a flat surface, such as a wall, a ceiling, or a floor. In other examples, as shown in FIGS. 3 and 4, the work area 108 is a corner work area 128 that has a corner or edge deflected at an angle greater than a minimum bend radius of the cable 106.

The body portion 102 provides a grip by which the device 100 is held against the work area 108 when the cable 106 is installed on the work area 108. In some examples, the body portion 102 is configured to engage a holding medium 90 (FIG. 3) that is used to hold the device 100 at the work area 108. The holding medium 90 can be of any type suitable for supporting the device 100 at the work area 108 while the cable 106 is routed around the device 100 on the work area 108. In some examples, the holding medium is one or more fingers of a user. For example, the user can hold the device 100 by grabbing the body portion 102 with two or more fingers. In other examples, the user need to use one finger, as described below. In yet other examples, the holding medium is a tool or instrument that is configured to be engaged with the body portion 102. Examples of such a tool or instrument include a wrench, a stick, a tube, and an elongate bar.

The body portion 102 has a forward end 112 and a rearward end 114. In some examples, the body portion 102 defines an engaging hole 116. The body portion 102 is connected to the guide surface at the forward end 112. The engaging hole 116 is opened at the rearward end 114 and configured to receive the holding medium 90. For example, the holding medium 90, such as a forefinger, is inserted into the engaging hole 116 to place the device 100 against the work area 108. In this configuration, the device 100 is worn on a forefinger 90 like a thimble to help routing the cable 106 around the device 100 at the work area 108. A user wearing the device 100 on the user's finger can put the finger on a predetermined location of the work area 108 at which the cable 106 is installed, and route the cable 106 around the device 100.

Figure 2:
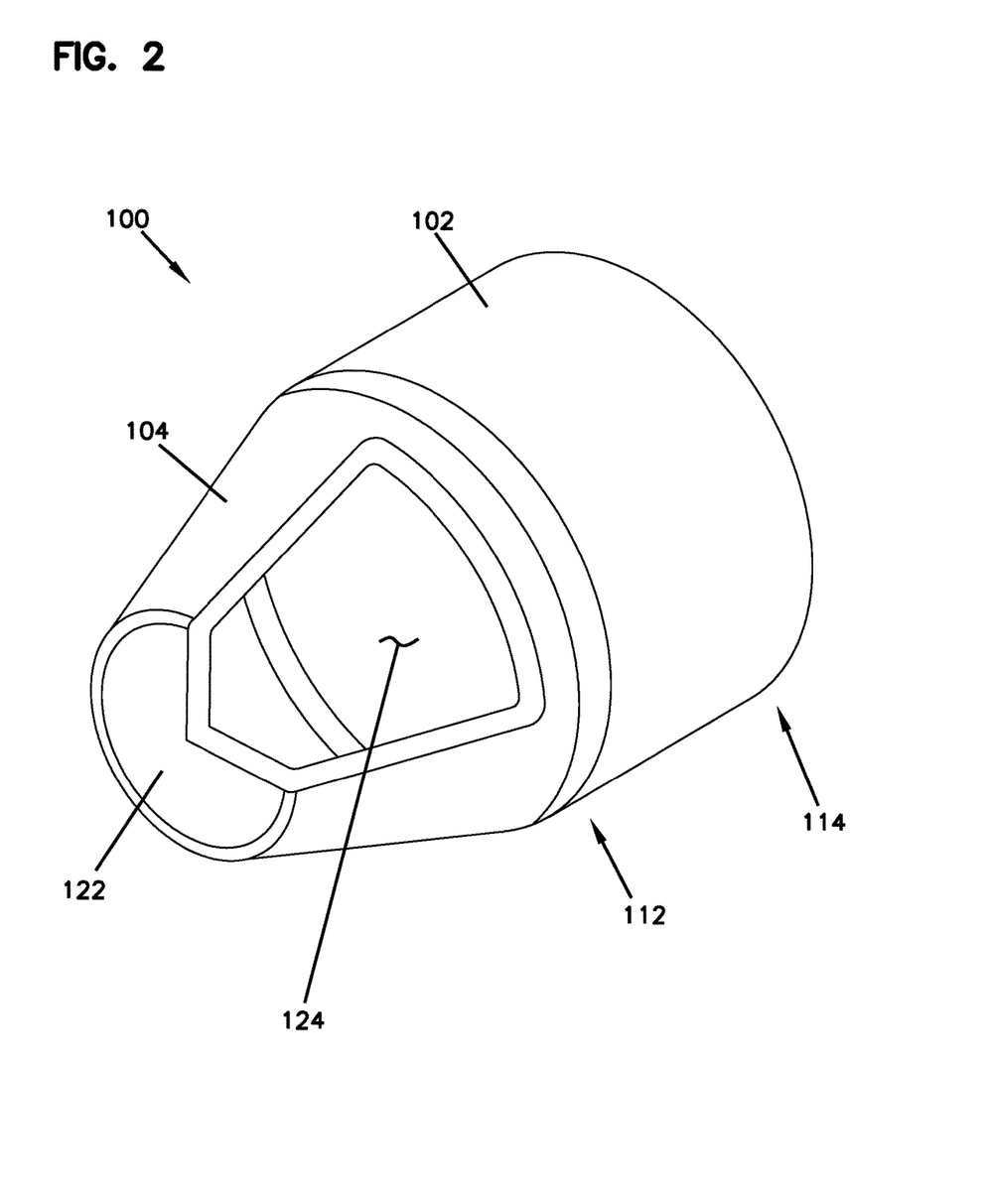
FIG. 2 is a front perspective view of the cable guide device of FIG. 1.

The guide surface 104 is connected to the body portion 102 at the forward end 112 of the body portion 102 and provides a surface along which the cable 106 is routed. In some examples, the guide surface 104 includes a curved portion having a radius of curvature not less than the minimum bend radius of the cable 106. In some examples, the guide surface 104 is configured as a truncated cone shape, as depicted in FIGS. 1 and 2. The guide surface 104 is arranged at the work area 108 such that the cable 106 is routed around the guide surface 104 at the work area 108.

As described above, the user who holds the device 100 by engaging the holding medium 90 with the body portion 102 can place the device 100 at the work area 108 so that the guide surface 104 is properly arranged on the work area 108 and allows the cable 106 to route around the guide surface 104 along a predetermined path of the work area 108. The cable 106 that is routed around the guide surface 104 is not bent greater than the minimum bend radius of the cable 106 due to the radius of curvature of the guide surface 104. In some examples, once the cable 106 is routed around the guide surface 104, the cable 106 is attached or fixed to the work area 108 by several means, such as an adhesive, cable clips, and any other suitable methods. After the cable 106 is properly routed along the predetermined path on the work area 108, the device 100 can be removed from the work area 108. Examples of installing cables with an adhesive is described in U.S. patent application Ser. No. 14/063,732, titled SYSTEM AND METHOD FOR APPLYING AN ADHESIVE COATED CABLE TO A SURFACE, filed on Oct. 25, 2013, the disclosure of which is hereby incorporated by reference in its entirety.

FIG. 2 is a front perspective view of the cable guide device 100 of FIG. 1. In some examples, the cable guide device 100 further includes a support portion 122 and a corner engaging portion 124.

The support portion 122 provides an area configured to be abutted to a flat work area 108 when the guide surface 104 is placed on the work area 108. For example, where the work area 108 is a flat surface, the device 100 is held at the work area 108 such that the support portion 122 is placed on the work area 108 to provide a path for the cable 106 around the guide surface 104 on the work area 108. In some examples, where the guide surface 104 is formed as a truncated cone shape, the support portion 122 is defined by a top plane of the truncated cone shape, as shown in FIG. 2.

The corner engaging portion 124 operates to engage the device 100 with a corner work area 128 (FIGS. 3 and 4). In some examples, the corner engaging portion 124 is configured as a cutout portion, which is also referred to herein as a notch. The corner engaging portion 124 is formed in the guide surface 104 by cutting out a portion of the guide portion 104. In the depicted example, the corner engaging portion 124 is cut out about a quarter (90 degree) of the guide portion 104, which can receive a portion of a right-angled corner or edge, thereby allowing the guide portion 104 to be engaged with the corner or edge.

Figure 5:
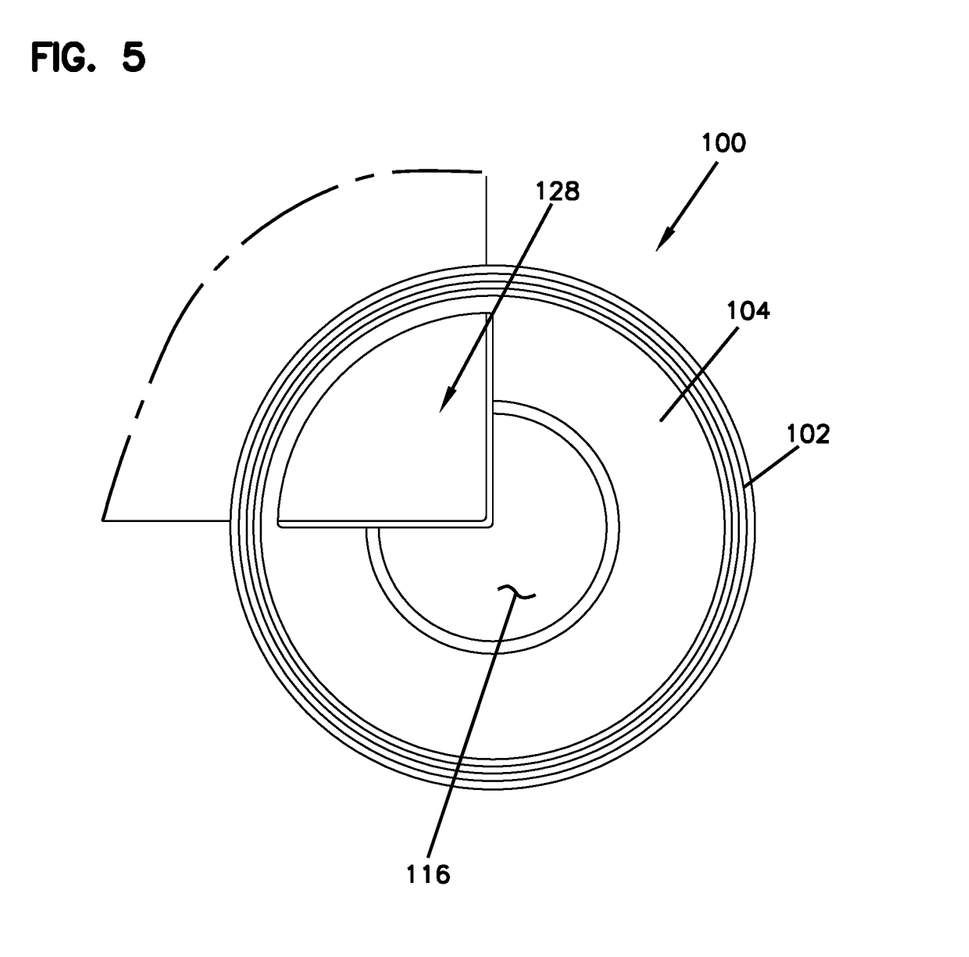
FIG. 5 is a rear side view of the device of FIG. 3.

FIGS. 3-5 illustrate that the device 100 is engaged with a corner work area 128 to help routing the cable 106 around the corner work area 128. In particular, FIG. 3 illustrates the device 100 engaged at a corner work area 128. FIG. 4 is an exploded view of the device 100 of FIG. 3. FIG. 5 is a rear side view of the device 100 of FIG. 3.

As depicted, a user engages the user's forefinger with the engaging hole 116 of the body portion 102 and places the device 100 at the corner work area 128 by engaging the corner engaging portion 124 with an outside corner or edge of the corner work area 128. In this example, the corner work area 128 is described as a corner or edge of a door frame 92. However, the corner work area 128 can be of any type having a corner or edge along which the cable 106 is routed and/or attached. When the corner engaging portion 124 is engaged with the corner work area 128, the guide surface 104 forms a routing path over which the cable 106 is routed. In this example, the routing path is formed by a combination of the guide surface 104 and abutted sides 94 of the door frame 92.

Figure 6:
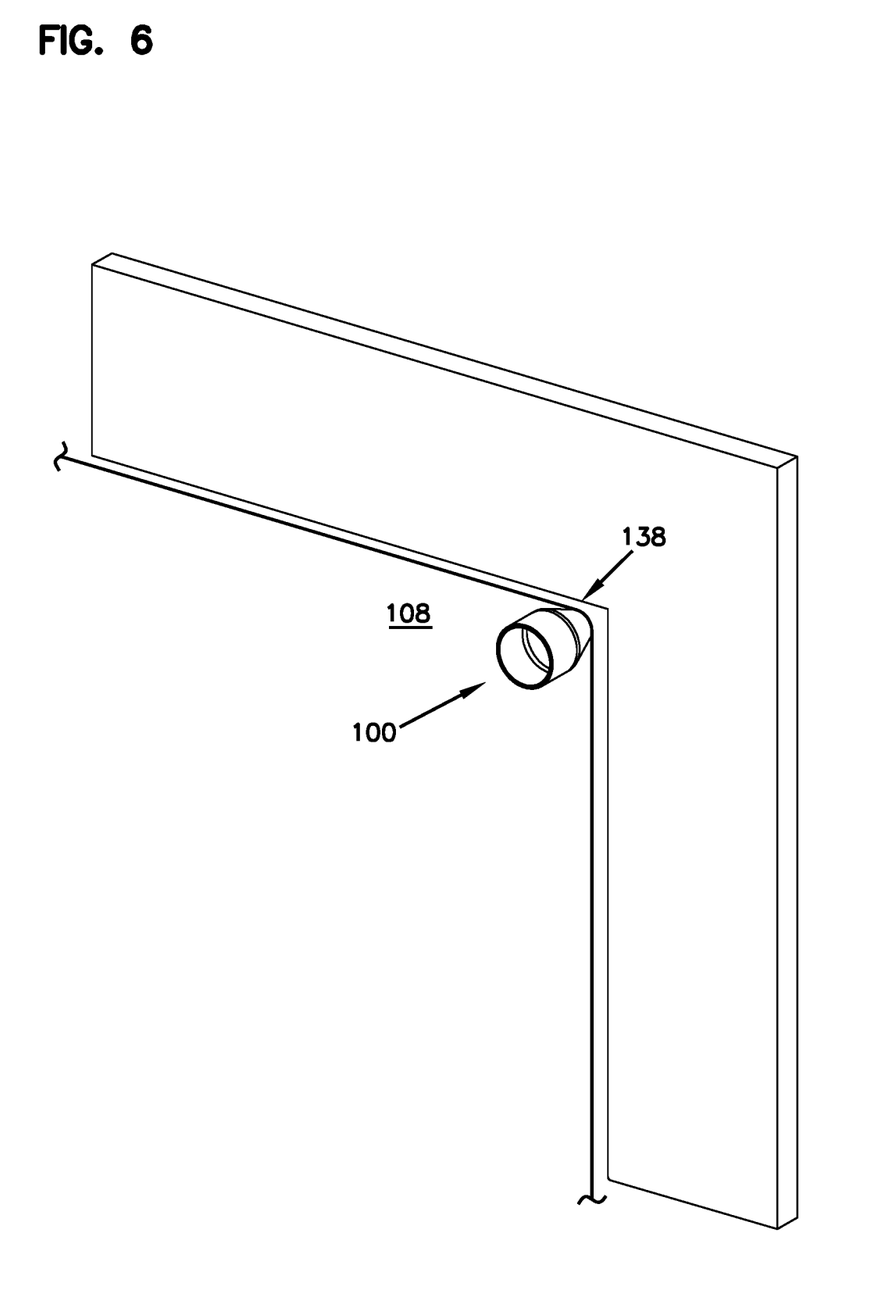
FIG. 6 illustrates the device engaged at an inside corner work area.

FIG. 6 illustrates that the device 100 is engaged with an inside corner area 138 to help routing the cable 106 on the working area 108 (e.g., a wall) around the inside corner area 138. The features and operation of the device 100 in this example are similar to the previous examples, and thus the description of the device 100 is omitted for brevity purposes.

Figure 7:
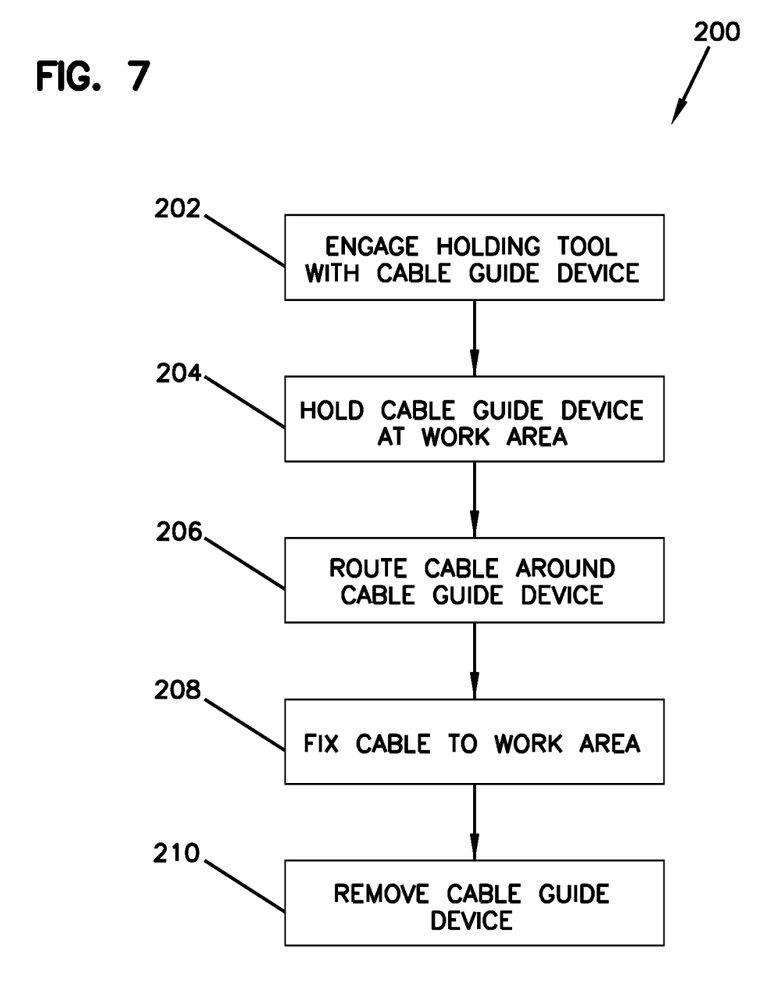
FIG. 7 illustrates an exemplary method of guiding a cable without damage to the cable.

FIG. 7 illustrates an exemplary method 200 of guiding a cable without physical and/or functional damage to the cable. For example, the method 200 implements routing a cable at a radius larger than a minimum bend radius of the cable. In some examples, the method 200 includes operations 202, 204, 206, 208, and 201.

At the operation 202, a user engages the holding medium 90 to the cable guide device 100. In some examples, the user engages his or her finger into the engaging hole 116 of the body portion 102. In other examples, the user engages an elongate tool or instrument into the engaging hole 116. In yet other examples, the user can grab the body portion 102 of the device 100.

At the operation 204, the user holds the device 100 at the work area 108 along which the cable 106 is to be routed. In some examples, where the work area 108 is a flat surface, the user can place the support portion 122 of the device 100 on the work area 108 (or the work area 108 around the inside corner work area 138) so that the guide portion 104 provides a curved wall along which the cable 106 is routed. In other examples, where the work area 108 is a corner work area 128, the user can engage the cutout portion 124 with the corner work area 128 so that the guide portion 104 receives a curved portion of the corner work area 128 into the inside of the device 100 and forms a continuous path over the guide portion 104 along which the cable 106 is routed.

At the operation 206, the user routes the cable 106 around the device 100. In some examples, the user can route the cable 106 over the guide surface 104 so that the cable 106 is not bent at a radius greater than its minimum bend radius.

At the operation 208, the user can attach the cable 106 to the work area 108, 128 or 138 once the cable 106 is routed around the device 100. In some examples, the cable 106 is attached to the work area 108, 128 or 138 with an adhesive. In other examples, the cable 106 is fixed to the work area 108, 128 or 138 with other methods, such as cable clips.

At the operation 210, the user removes the device 100 from the work area 108, 128 or 138 while the cable 106 remains attached on the work area 108, 128 or 138. The device 100 can be reused for routing another cable on the same or different work area. As such, there is no need of permanently attaching a bend limiting device of any type to a work area to route a cable without physical and/or function damage to the cable.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A method of installing a cable along a work area, the method comprising:
   placing a temporary bend radius limiter against the work area, the temporary bend radius limiter including a curved portion;
   while the temporary bend radius limiter is placed stationary against the work area, routing the cable about the curved portion of the temporary bend radius limiter along a curved path of the work area defined by the curved portion of the temporary bend radius limiter;
   adhering the cable to the work area such that adhesive retains the cable to the work area along the curved path; and
   removing the temporary bend radius limiter from the work area once the cable has been adhesively retained to the work area along the curved path.

2. The method of claim 1, wherein the step of placing the temporary bend radius limiter against the work area further comprises:
   wearing the temporary bend radius limiter on a finger; and
   placing the finger with the temporary bend radius limiter on a location of the work area to place the temporary bend radius limiter against the work area.

3. The method of claim 1, wherein the curved portion of the temporary bend radius limiter has a radius of curvature not less than a minimum bend radius of the cable.

4. The method of claim 1, wherein the temporary bend radius limiter includes a cutout portion configured to at least partially receive a corner of the work area.

5. A method of guiding a cable at a radius larger than a minimum bend radius of the cable, the method comprising:
   holding a device at a work area, the device including a curved portion;
   while the device is held stationary at the work area, routing the cable about the curved portion of the device along a curved path of the work area defined by the curved portion of the device;
   fixing the cable to the work area such that the cable is retained to the work area along the curved path; and
   removing the device from the work area once the cable has been retained to the work area along the curved path.

6. The method of claim 5, wherein the device includes a cutout portion configured to at least partially receive a corner of the work area.

7. The method of claim 6, wherein fixing the cable to the work area comprises attaching the cable to the work area with an adhesive.

8. The method of claim 6, wherein holding the device at the work area comprises engaging the device at a corner work area.

9. The method of claim 6, wherein the step of placing the temporary bend radius limiter against the work area further comprises:
   wearing the device on a finger; and
   placing the finger with the device on a location of the work area to hold the device at the work area.

10. The method of claim 6, wherein the curved portion of the device has a radius of curvature not less than the minimum bend radius of the cable.

* * * * *